(12) United States Patent
Daenen

(10) Patent No.: US 6,467,985 B1
(45) Date of Patent: Oct. 22, 2002

(54) FASTENING ELEMENT FOR A WIPER ARM, AND METHOD OF MANUFACTURING THE SAME

(75) Inventor: Roger Daenen, Vlytingen-Riemst (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,724
(22) PCT Filed: Jun. 18, 1998
(86) PCT No.: PCT/DE98/01667
§ 371 (c)(1), (2), (4) Date: Mar. 11, 1999
(87) PCT Pub. No.: WO99/03713
PCT Pub. Date: Jan. 28, 1999

(30) Foreign Application Priority Data

Jul. 17, 1997 (DE) .......................................... 197 30 579

(51) Int. Cl.⁷ ................................................. B60S 1/34
(52) U.S. Cl. ................. 403/79; 15/250.34; 15/250.351; 15/250.352
(58) Field of Search ........................ 15/250.34, 250.351, 15/250.352; 403/79

(56) References Cited

U.S. PATENT DOCUMENTS

| | | | |
|---|---|---|---|
| 3,800,356 A | * | 4/1974 | Ito ........................... 15/250.34 |
| 4,564,971 A | * | 1/1986 | Petheres et al. ..... 15/250.351 X |
| 4,615,067 A | * | 10/1986 | Benetau ............. 15/250.352 X |
| 4,856,137 A | * | 8/1989 | Palu .................. 15/250.352 X |
| 4,907,315 A | * | 3/1990 | Arai et al. .......... 15/250.352 X |
| 5,175,903 A | * | 1/1993 | Curtis ..................... 15/250.34 |
| 5,253,388 A | * | 10/1993 | Bacconnier ........ 15/250.352 X |
| 5,319,851 A | * | 6/1994 | Ikezawa et al. ..... 15/250.352 X |
| 5,398,370 A | * | 3/1995 | Gorner et al. ....... 15/250.34 X |
| 5,647,680 A | * | 7/1997 | Bienert et al. ....... 15/250.34 X |
| 5,729,860 A | * | 3/1998 | Lisiecki ............. 15/250.352 X |
| 5,735,015 A | * | 4/1998 | Yoshida et al. .......... 15/250.34 |
| 5,755,005 A | * | 5/1998 | Turbessi et al. ......... 15/250.34 |
| 5,778,484 A | * | 7/1998 | Lisiecki et al. ......... 15/250.335 |
| 5,894,628 A | * | 4/1999 | Egner-Walter et al. .. 15/250.34 |
| 6,059,294 A | * | 5/2000 | Gorce ................. 15/250.34 X |

* cited by examiner

Primary Examiner—Lynne H. Browne
Assistant Examiner—John R. Cottingham
(74) Attorney, Agent, or Firm—Michael J. Striker

(57) ABSTRACT

The invention is based on a fastening element for a wiper arm, which on one end has a first fastening region (12) with a conical hub (14) and on another end has a second fastening region (18) with a bearing point (20).

It is proposed that the fastening element comprises a middle, longitudinally extending, prefabricated carrier part (22), and the fastening regions (12, 18) are formed by separate heads (24, 26) cast onto two ends (10, 16) of the carrier part (22).

15 Claims, 2 Drawing Sheets

FASTENING ELEMENT FOR A WIPER ARM, AND METHOD OF MANUFACTURING THE SAME

BACKGROUND OF THE INVENTION

The invention is based on a fastening element for a wiper arm, and on a method for producing it.

Fastening elements for windshield wipers, particularly for the wiper arm, often comprise zinc or a zinc alloy and are made by pressure casting a pressure casting mold. The zinc can be processed very well, is gentle to the pressure casting tool, and makes very good surface qualities possible. However, it has been found that zinc changes its microstructure in stressed regions over the course of time. The material becomes brittle, which increases the risk of breakage. This occurs to an increased extent in relatively long fastening elements because of the greater bending stresses and particularly at the connection points to adjoining components, such as in the region of a conical hub of the fastening element, which is pressed by means of a nut onto a knurled conical drive shaft of a windshield wiper drive mechanism. This creates tensile strains which are superimposed on the bending stresses, thus increasing the risk of breakage still further.

From European Patent Disclosure EP 0 584 018 A1, a fastening element with a sheet-metal part coated with plastic is known. The sheet-metal part has a conical hub on one end and a bearing point for a shaft on the other. In the region of the bearing point, the sheet-metal part protrudes with a curved portion out of the plastic, and in this portion there is a hole for suspending a tension spring. On its outer circumference in the region of the conical hub, the sheet-metal part has recesses or notches, so that a favorable form lock with be achieved between the plastic sheathing and the sheet-metal part.

In assembly, the fastening element is pressed directly with the conical hub of the sheet-metal part onto the drive shaft, which can damage the knurled structure of the drive shaft, so that the force transmission when a replacement part has to be installed may no longer suffice.

From German Patent Disclosure DE 44 44 328 A1, a fastening element of zinc, a zinc alloy, or aluminum or an aluminum alloy is known in which a reinforcing element is integrally cast at least in the region of a conical hub and surrounds the hub and extends in corelike fashion at least partway inside the body of the fastening element.

The reinforcing element has extensions that extend at least as far as the surface of the body of the fastening element. As a result, during production, the reinforcing element can be fixed exactly in its position, so that close tolerances can be adhered to in the critical hub region. DE 44 44 328 A1 also proposes that the reinforcing element extend over the entire length in the body of the fastening element, which makes economies of material and thus slender fastening elements possible.

The material bond between the casting material and the reinforcing element is reinforced by creating a form-locking bond with openings, holes or slits in the reinforcing element.

In order not to destroy the knurled structure on the drive shaft during assembly, it is proposed that the reinforcing element also be surrounded toward a center axis of the hub by cast material, preferably with a wall thickness of approximately 1.5 mm. As a result, the knurled structure can dig into the soft casting material so that strong forces can be transmitted with form- and force-locking. Because of the thin wall thickness, the bending stresses and tensile strains are absorbed virtually solely by the reinforcing element.

It is also known, particularly with relatively long fastening elements, to use aluminum or an aluminum or an aluminum alloy instead of zinc, to attain better long-term strength and to prevent breakage from brittleness. However, aluminum attacks the pressure casting tool, with attendant higher post machining costs and shorter service lives of the tool. The material costs for aluminum are also higher than for zinc.

The fastening elements described above from the prior art are cast or coated with a casting mold. If fastening elements of different lengths or different shapes are to be made, then a separate casting mold is required for each variant.

ADVANTAGES OF THE INVENTION

According to the invention, the fastening element comprises a middle, longitudinally extending, prefabricated carrier part, which is made from aluminum or preferably steel or a steel alloy in a bending and stamping operation on the ends of the prefabricated carrier part, fastening regions that are separated from one another later are cast in the form of heads, one of which has a conical hub and the other of which has a bearing point for the wiper arm. Zinc, a zinc alloy, aluminum, an aluminum alloy, magnesium, a magnesium alloy, or in certain embodiments plastic are particularly suitable as casting material for the heads.

In different variants of the fastening elements, often only the lengths and the shapes are different, while the fastening regions can be identical. With the fastening element of the invention, standard heads can be cast onto variously embodied carrier parts, thus creating different variants economically without requiring different casting molds. The number of tools required and thus tool costs are reduced. Another factor contributing to low tool costs is that the casting molds are smaller, since they do not surround the entire fastening element but instead only its ends, thus economizing on casting material. Production is also facilitated because the carrier part can be fixed precisely without needing extensions. The casting tools and a fixing device can be functionally and spatially separate and can thus be made economically.

With a flexurally rigid carrier part, for instance of steel, or a steel alloy and with a hollow or U- or T-shaped profile, and so forth, especially lightweight and slender fastening elements that present only little surface area to the wind can be created.

Further advantageous embodiments of the fastening element are possible with the characteristics recited in the dependent claims.

In the region of the hub, the fastening element is at especially high risk of breakage and twisting, because it is in this region that the greatest bending stresses occur, because the lever arms are longest. The bending stresses also have tensile strains superimposed on them that originate in the mounting of the conical hub on a conical drive shaft. It is proposed that in this region an inlay part that surrounds the head and is made of material with tensile strength be integrally cast with the head and in this region absorb the tensile and bending stresses and relieve the casting material. Steel, a steel alloy, aluminum, an aluminum alloy, or some other strong material familiar to one skilled in the art can be used as material for the inlay part. By this means, different demands of the casting material can be taken better into account, such as good processability, high surface quality, and so forth.

To attain a favorable flow of force from the head and especially the inlay part to the carrier part, in one feature of the invention the inlay part and the carrier part are joined together in form- and/or force-locking fashion. Peak stresses at the transitions from the carrier part to the cast-on head are avoided, and as a result the entire head can be made slender, lightweight, and with little casting material. Particularly in this feature, casting materials with low strength can be used, such as various plastics. To that end, the inlay part and the carrier part can be joined together with familiar plug- and clamp-type connections.

If the inlay part, in the region of the conical hub, comes into direct contact with the conically embodied drive shaft, the surface of the drive shaft can be damaged, especially if it has a knurled structure. To prevent this, the drive shaft can be hardened. In one feature of the invention, however, it is proposed that the inlay part be coated toward a center axis of the hub with casting material having a wall thickness of approximately 1.5 mm. The knurled structure on the drive shaft can dig into the soft material and can transmit high rotational forces by form locking without destroying the knurled structure. Mechanical stresses, such as pressure and bending stress, however, are absorbed virtually solely by the inlay part, because of the slight wall thickness.

The casting material toward the center axis of the hub can be injected through a second channel in the casting tool. However, it is advantageous if only one channel is required for both the inner and the outer casting material. According to the invention, this is attained with a region on a top and/or bottom face end of the hub by way of which the inner and outer casting material are joined to one another. In the production of the head, this casting material can flow from the outer part of the hub to the inner part of the hub, or vice versa, via this region. It is also proposed that recesses be made in the hub or that hubs with recesses be used, by way of which again the casting material flows, as a result of which the casting material can be distributed quickly and uniformly.

The fastening element is pressed by means of a nut with its conical hub from above onto a conical drive shaft. As a result, especially high assembly strains or pressures per unit of surface area and tensile stresses, which threaten the cross section, arise in the upper, narrower region of the hub, and especially on the surface of the head on which the nut is supported. In one embodiment of the invention, it is proposed that the inlay part have a collar toward the narrower region of the hub. Preferably, the collar extends to the surface of the head, and as a result the nut can be supported on the inlay part, while in the uppermost, narrowest region of the hub, the pressures per unit of surface area and tensile strains can be absorbed entirely by the collar.

A bearing point for the wiper arm is disposed in the second head of the fastening element. As a rule, the wiper arm is connected to the fastening element via a shaft which is guided in a bearing bush in the fastening element. A retaining clip is suspended from a pin in the fastening element by a tension spring which is connected to the wiper arm and braces the two components together and presses the windshield wiper against the windshield. Preferably, the fastening region is cast integrally into the head, which saves one assembly step later, but the shaft can also be supported directly in the casting material, if this material has adequate sliding properties, or if the shaft does not execute any, or only a few, relative motions in it.

The pin for the tension spring can also be cast integrally into the head, again saving a further assembly step. This effect is also attained with a carrier part which protrudes in the head region out of the casting material and has a hole or an undercut from which the tension spring can be suspended. The pins for the fastening elements are then omitted.

To reinforce the material bond between the casting material and the carrier part, it is proposed that the carrier part be form-lockingly joined to one or both heads by a shaping, for instance by means of apertures such as holes, slits, advantageously with collars or leadthroughs, by means of undercuts, notches, recesses and so forth. This is important especially with zinc or zinc alloys, which do not enter into any metal-to-metal bond with the carrier part in the pressure casting.

A method for producing the fastening elements is advantageously distinguished by the fact that with one pressure casting apparatus and two pressure casting molds, standard heads can be cast onto different carrier parts, by adjusting the pressure casting molds successively or simultaneously to one another or to a respective end of the carrier part in accordance with the variant to be made. The pressure casting molds can be small and can be made without fixing devices for the carrier part and thus can be made economically. Preferably in the method an adapter piece is disposed between the pressure casting molds; with it, the carrier part is fixed and the pressure casting molds are adjusted to one another. The adapter piece can be replaced quickly and easily for different variants, and furthermore the pressure casting molds can be fixed quickly relative to one another or to the carrier part.

BRIEF DESCRIPTION OF THE DRAWING

Shown are.

DESCRIPTION OF THE PREFERRED EMBODIMENTS

Figure 1:
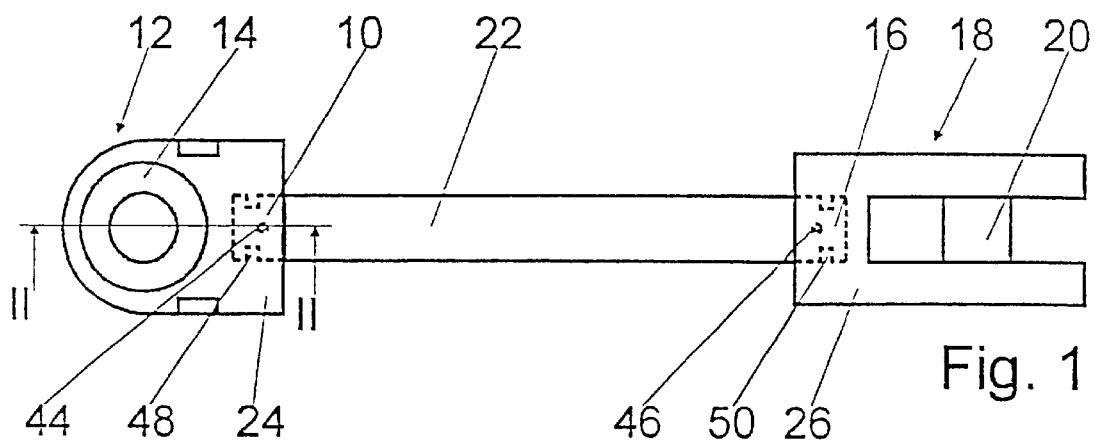
FIG. 1, a fastening element seen from below.

In FIG. 1, a fastening element for a wiper arm or for a windshield wiper is shown, which is secured to a conical drive shaft, not shown. The fastening element has a first fastening region 12 on one end, with a conical hub 14, and a second fastening region 18, with a bearing point 20 for the wiper arm, on the other. According to the invention, the fastening element has a middle, longitudinally extending, prefabricated carrier part 22, on whose ends 10, 16 the fastening regions 12, 18 are embodied in the form of two heads 24, 26 separately cast on. Materials with high tensile strength, such as steel in particular or a steel alloy, are suitable as material for the carrier part 22. Preferably, this part is made in a bending and stamping operation. For the material of the heads 24, 26, materials that can be readily pressure-cast are suitable, such as zinc, aluminum, magnesium, and so forth, and alloys thereof; with zinc, surfaces of especially high quality are possible, and furthermore pressure casting tools used for it attain long service lives since zinc does not attack them.

The ends 10, 16 of the carrier part 22 have a shaping, such as holes 44, 46, recesses 48, 50, etc., so that the material bond between the cast-on ends 24, 26 and the carrier part 22 is reinforced by form-locking.

Figure 2:
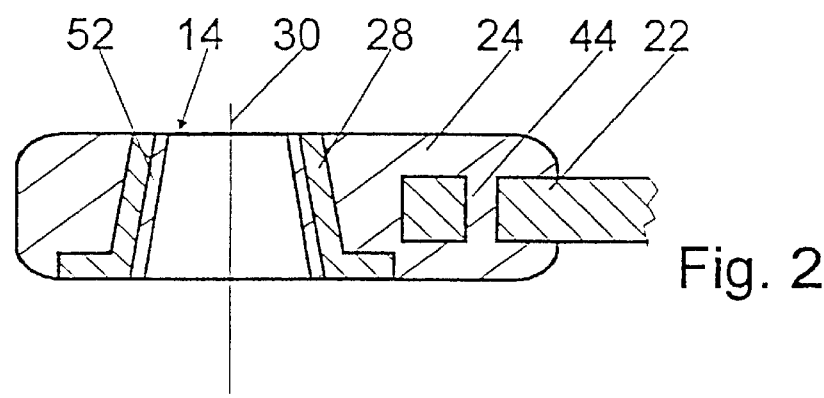
FIG. 2, an enlarged fragmentary section taken along the line II—II of FIG. 1.

The region of the hub 14 is at especially high risk of breakage and twisting from tensile stresses on the conical drive shaft during assembly and high bending stresses as a consequence of long lever arms (FIG. 2). To reduce the risk of breakage and twisting, an inlay part 28 surrounding the hub 14 is cast integrally into the head 24. The bending stresses and tensile strains are absorbed virtually entirely by the inlay part 28. The hub 14 is pressed from above onto a drive shaft via a nut, resulting in especially high stresses in the upper, narrower region 74 of the hub 14. In a variant shown in FIG. 4, the inlay part 72 has a collar 76 toward the narrower region 74 of the hub 14. The collar 76 extends as far as the surface of the head 74. As a result, the nut can be supported on the collar 76 of the inlay part 72, and thus pressures per unit of surface area and tensile stresses in the upper region 74 of the hub 14 can be absorbed virtually completely by the collar 76, and the remainder of the casting material can be relieved. The nut is preferably surrounded by a guide rib 86, which makes assembly easier and protects the nut. Materials with tensile and bending strength, such as steel, a steel alloy, aluminum, an aluminum alloy, etc., are especially suitable as materials for the inlay part 28.

If the inlay part 28 comes into direct contact with the conical drive shaft, then the surface of the drive shaft can be damaged during assembly, especially if it has a knurled structure and is not surface-hardened. It is proposed that the inlay part 28 be coated by casting in such a way that it has a cast layer 52 toward a center axis 30 of the hub 14. The cast layer 52 is located between the inlay part 28 and the drive shaft and is preferably 1.5 mm thick. Thus the knurled structure of the drive shaft can dig into the soft casting material during assembly without being destroyed, and furthermore, because of the slight wall thickness, the bending stresses and tensile strains are absorbed virtually completely by the inlay part 28. The inner cast layer 52 can be injected through a second channel in the casting tool.

Figure 4:
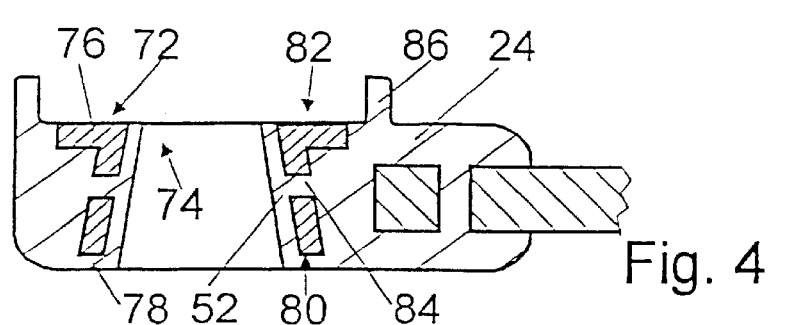
FIG. 4, a variant of the feature in FIG. 2.

In the version of the invention shown in FIG. 4, however, the head 24 and inner cast layer 52 can be injected with only a single channel, because the inner cast layer 52 is joined to the remainder of the head 24 via a region 78 on one face end 80 of the inlay part 72. Next to the region 78, the casting material can be distributed from the outer to the inner region of the inlay part 72, or vice versa, via recesses 84, which promote uniform and also rapid distribution. The region 78 and the recesses 84 can be utilized either jointly or individually. It is also possible for the cast layer 52 to be joined to the remainder of the head on the face end 82 of the inlay part via a region not shown.

Figure 3:
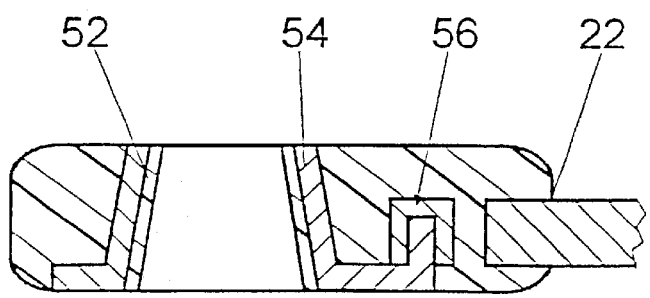
FIG. 3, a variant of the feature in FIG. 2.

In an embodiment of the invention shown in FIG. 3, an inlay part 54 is connected in form- and/or force-locking fashion to the carrier part 22 via a plug connection 56, in order to achieve a favorable flow of force from the carrier part 22 to the inlay part 54 without the incidence of peak stresses at transitions. Particularly in this kind of embodiment, heads 24, 26 of plastic are also conceivable.

Figure 5:
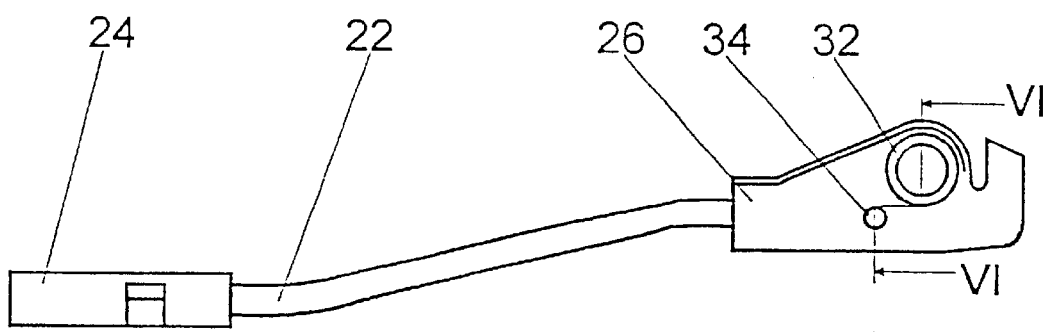
FIG. 5, a side view of the fastening element.
Figure 7:
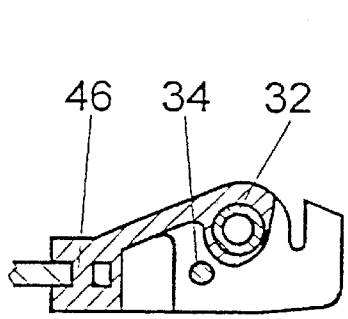
FIG. 7, a section taken along the line VII—VII of FIG. 6.
Figure 6:
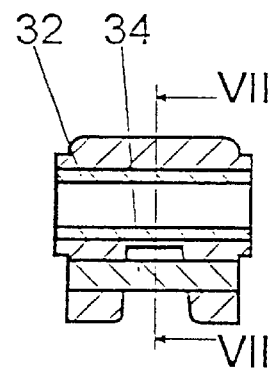
FIG. 6, a section taken along the line VI—VI of FIG. 5.

In the head 26, a wiper arm, not shown, is pivotably connected via a shaft (FIG. 5). The wiper arm and the fastening element are furthermore joined via a tension spring, also not shown, which is suspended by a clip on a pin 34 from below in the fastening element. For the shaft, preferably a bearing bush 32, and/or for the tension spring the pin 34, is cast integral with the head 26, so that assembly steps are saved. It can be seen in FIG. 6 and in FIG. 7 that the bearing bush 32 is preferably entirely surrounded by casting material, as a result of which a secure hold is attained.

Figure 8:
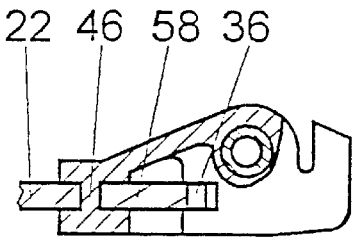
FIG. 8, a variant of the feature in FIG. 7.

In a variant shown in FIG. 8, the carrier part 22, instead of a pin 34, has a region 58 that protrudes out of the head 26 and that has a hole 36, undercut or other shaping in which the clip or the tension spring itself can be suspended. In that case, the pin 34 can be dispensed with.

In a production method for the fastening element, the carrier part 22 is first fixed in a chucking device.

Figure 9:
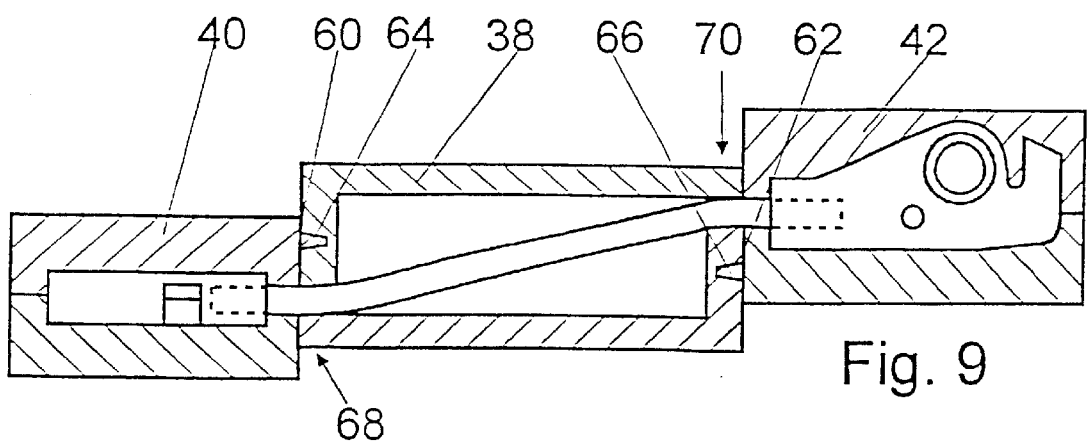
FIG. 9, a fastening element, fixed in an adapter piece, and two pressure casting molds.

The chucking device is preferably formed by an adapter piece 38, which fixes the carrier part 22 at two outer points 68, 70 (FIG. 9). Next, two pressure casting molds 40, 42 are adjusted either successively or preferably simultaneously to the carrier part 22 and to one another. The adapter piece 38 can be used for fast adjustment of the pressure casting molds 40, 42, by bringing molds to fitting faces 60, 62 intended for the purpose, with or without guide devices such as conical protrusions 64, 66. Once the pressure casting molds 40, 42 are correctly positioned, they are closed and thereby tightly surround the ends 10, 16 of the carrier part 22. The casting material is injected under pressure-into the pressure casting molds 40, 42 and surrounds the ends 10, 16 of the carrier part 22. If fastening elements of other dimensions but the same heads 24, 26 are to be made, then only the adapter piece 38 is changed, and the pressure casting molds 40, 42 can be quickly set up for a new adapter piece 38.

What is claimed is:

1. A fastening element for a wiper arm, which on one end has a first fastening region (12) with a conical hub (14) and on another end has a second fastening region (18) with a bearing point (20), characterized in that the fastening regions (12, 18) are formed by separate heads (24, 26), cast onto two ends (10, 16) of a prefabricated, longitudinally extending middle carner part (22), an inlay part (28, 54, 722) surrounding the conical hub (14a) is cast integrally into the first head (24) having the hub (14), the inlay part (28, 54, 72) has a cast layer (52) toward a center axis (30) of the hub (14); and the inlay part (72) has a collar (76) toward the narrower region (74) of the hub (14).

2. A fastening element for a wiper arm, which on one end has a first fastening region (12) with a conical hub (14) and on another end has a second fastening region (18) with a bearing point (20), characterized in that the fastening regions (12, 18) are formed by separate heads (24, 26), cast onto two ends (10, 16) of a prefabricated, longitudinally extending middle carrier part (22), an inlay part (28, 54, 722) surrounding the conical hub (14a) is cast integrally into the first head (24) having the hub (14).

3. The fastening element of claim 1, characterized in that the cast layer (52) communicating with the remaining cast material via a structure selected from the group consisting of a region (78) on at least one face end (80,82) of the inlay part (72), and at least one recess (84) in the inlay part (72).

4. The fastening element of claim 2, characterized in that a bearing bush (32) is cast integrally with the second head (26).

5. The fastening element of claim 2, characterized in that a pin (34) is cast integrally with the second head (26).

6. The fastening element of claim 2, characterized in that the carrier part (22) has a region (58), protruding from the second head (26), that has a hole (36) or an undercut.

7. The fastening element of claim 2, characterized in that the carrier part (22) is form-lockingly joined by a shaping to one or both heads (24,26).

8. The fastening element of claim 2, characterized in that the heads (24, 26) comprise zinc, a zinc alloy, aluminum, an aluminum alloy, or magnesium or a magnesium alloy.

9. The fastening element of claim 2, characterized in that one or both heads (24, 26) are of plastic.

10. The fastening element of claim 2, characterized in that the carrier part (22) comprises steel, a steel alloy, or aluminum or an aluminum alloy.

11. The fastening element of claim 2, characterized in that the inlay parts (28, 54, 72) comprises steel, a steel alloy, or aluminum or an aluminum alloy.

12. A method for producing the fastening element of one of the foregoing claim 2, characterized by the following steps:
   the carrier part (22) is fixed in a chucking device;
   a pressure casting mold (40) is adjusted to one end (10) of the carrier part (22);
   the pressure casting mold (40) is closed and tightly surrounds the end (10) of the carrier part (22);
   the casting material is injected under pressure into the pressure casting mold (40) and surrounds the end (10) of the carrier part (22).

13. The method of claim 12, characterized in that two pressure casting molds (40, 42) are simultaneously adjusted to one another on the ends (10, 16) of the carrier part (22).

14. The method of claim 13, characterized in that an adapter piece (38) is disposed between the pressure casting molds (40, 42).

15. The fastening element of claim 2, characterized in that the inlay part (54) is joined to the carrier part (22) in a fashion selected from the group consisting of form-locking fashion, force-locking fashion, and both.

* * * * *